Sept. 26, 1961 R. W. SHREWSBURY ET AL 3,001,886

ARTICLE INCORPORATING CONCEALED INFORMATION THEREWITHIN

Filed June 10, 1957

INVENTORS
RAYMOND W. SHREWSBURY
DOUGLAS N. ANDERSON
WILLIAM E. SOHL
BY
Carpenter, Abbott, Coulter & Kinney
ATTORNEYS

1

3,001,886

ARTICLE INCORPORATING CONCEALED INFORMATION THEREWITHIN

Raymond W. Shrewsbury and Douglas N. Anderson, White Bear Lake, and William E. Sohl, Birchwood, Minn., assignors to Minnesota Mining and Manufacturing Company, St. Paul, Minn., a corporation of Delaware Filed June 10, 1957, Ser. No. 664,823
5 Claims. (Cl. 117—1)

This invention relates to a means of providing information in a safely concealed yet readily accessible form. More particularly this invention provides an article incorporating as an intrinsic part thereof concealed recorded information which can be revealed readily and quickly, but only by causing an irreversible change in the article.

The problem of maintaining recorded information secret is an ancient one and has resulted in the development of many elaborate schemes to protect such information from discovery by unauthorized personnel. Thus, elaborate codes have been developed in the commercial world as well as in the conduct of military affairs and diplomatic and numerous other activities whereby written information can be transmitted from place to place. Other schemes involve the transmission of recorded information by placing such information in a form ordinarily invisible to the naked eye and which can be readily made visible or audible only by special sensing mechanisms or chemicals.

However, in general these transmission methods are devoid of means for detecting whether or not the information being transmitted has been tampered with or exposed in its passage from its source to its destination. Moreover, many of these information transmitting systems require elaborate technical procedures to render the information readable.

It is among the objects of this invention to provide an article which may take the form of a flexible sheet, tape, film, or layer, while not being limited to these forms, which article incorporates as an intrinsic part thereof concealed recorded information in a substantially tamper-proof form. It is another object to provide such an article wherein the concealed information can be readily and quickly revealed by means of an implement such as an ordinary pencil eraser, requiring only light surface abrasion of the article. Other objects and advantages will appear as the description proceeds.

In its simplest aspects, this invention provides an article which may be in the form of a sheet, film or layer which may be wound in the form of the tape, prepared as a flexible sheet capable of being folded, creased or rolled, as a layer on a card, or in various other forms, which article includes in its information a substrate upon or within which is recorded information in the form of words, letters, numbers, or other indicia, which information may be in a form immediately visible to the naked eye or in a form which can be rendered visible or audibly reproduced by the action of light, chemicals, electrical, or other means. The substrate may be so constructed that the same or different recorded information may be detected from either or both surfaces of the substrate. Adhered to the substrate surface, or surfaces, on which the recorded information is detectable and overlying and concealing the recorded information is an opaque coating or covering which is removable by erasure or other light abrasive action, or otherwise readily removed, to uncover the recorded information concealed thereby.

A preferred form of the invention will now be described with reference to the accompanying drawing wherein:

2

Figure 1:
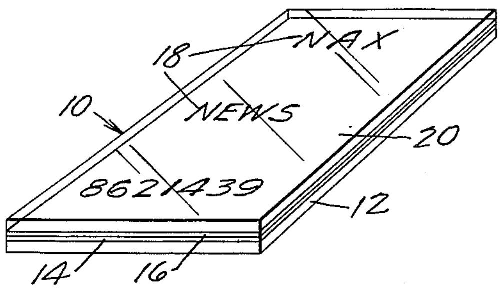
FIGURE 1 is a perspective view on an enlarged scale of a substrate formed in accordance with the present invention.

Referring now specifically to the preferred form of the invention illustrated in the accompanying drawings, there is shown in FIGURE 1 a substrate 10 comprising a suitable foundation film 12, in this instance a film of abrasion resistant transparent polyester resin, upon one surface of which is applied an adherent reflective metallic coating 14, in this case a coating of aluminum, over which is applied a further adherent layer 16, of transparent polyester resin. Upon the exposed surface of the polyester layer 16 is printed, marked, or otherwise visibly recorded, written information or indicia in the form of intelligible letters, signs, or symbols 18.

Figure 2:
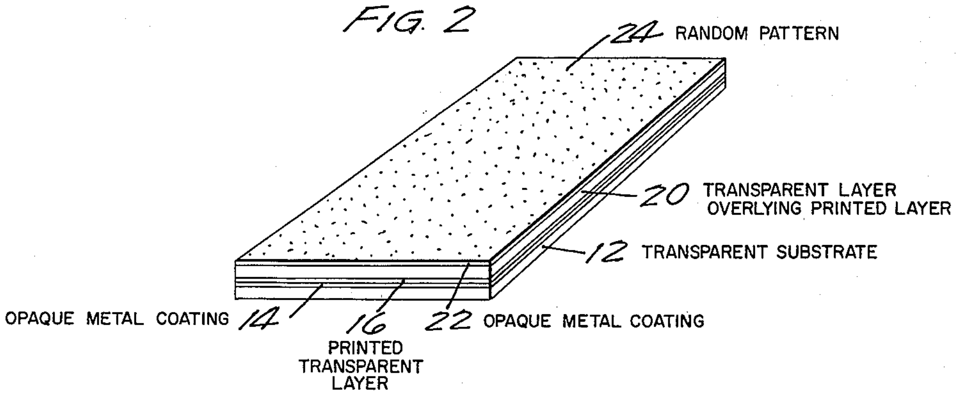
FIGURE 2 is a perspective view on an enlarged scale of the completed article.

Over the printed layer 16 is applied another layer 20 of abrasion resistant transparent polyester resin, which is then fused to layer 16 to form a unitary sheet or layer embodying the symbols 18 therewithin (layers 16 and 20 are illustrated as separate layers in the drawings for convenience of description). Covering the exposed surface of the last mentioned polyester layer 20 and concealing the symbols 18 in the formation of the completed article 21 illustrated in FIGURE 2 is an opaque metallic coating 22, applied in such a manner that it is capable of removal by light abrasion such as with an ordinary pencil eraser or the like.

The opaque metallic coating 22 is applied as a vapor deposition by means of known high vacuum, low temperature vapor deposition techniques, which manner of application provides thin, opaque, adherent coating.

Figure 3:
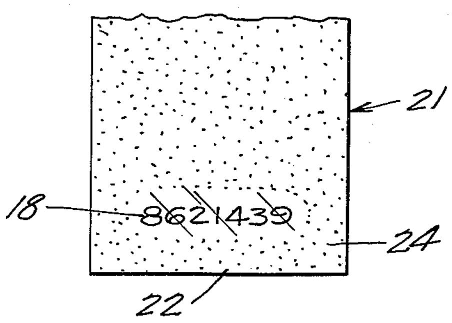
FIGURE 3 is a front elevational view on an enlarged scale of the article with a portion of the opaque surface removed therefrom revealing the recorded information on the substrate.

Exposure of any of the written information concealed within and forming a part of the article may be accomplished simply by erasing, as with an ordinary pencil eraser, the opaque metallic coating 22 overlying the printed surface as shown in FIGURE 3. Placing the article in a spark gap will also remove the opaque metallic coating, by vaporizing the metal, leaving the organic film undamaged. Solvents may also be applied to remove the opaque coating.

In the preferred form of the invention illustrated the exposed surface of the opaque metallic coating is provided with a distinctive and irreplaceable random pattern 24, which pattern may be provided by contaminants such as metal oxides or the like in the coating. Consequently, when a portion of the opaque coating 22 is removed to expose the written information thereunder by one of the methods noted above, the change in the article is an irreversible one.

Since the printing 18 is incorporated within the transparent polyester sheet formed by layers 16 and 20, the article cannot be delaminated by use of solvents without completely destroying the written information 18, the adhesive system forming the article utilizing only the materials of the strata themselves to provide adhesion. Thus it would not be possible to selectively dissolve the bonds joining the strata inasmuch as they form a unitary mass. Further, should the opaque coating, or a portion thereof, be removed by unauthorized personnel to expose the written information 18 to view, the originally deposited opaque coating 22 could not be readily duplicated, if at all. Even attempting such duplication would require relatively expensive equipment generally found only in larger industrial plants to provide an initial, vacuum deposited opaque metallic coating. Further, since the pattern of the opaque coating is a random one, formed by contaminants or the like, exact duplication of the original coating is not possible; and, consequently, any such attempted duplication is readily detectable by means of photographic comparisons with the original patterned coating.

The simplicity with which the concealed information can be revealed coupled with the tamper-proof character of the article provide a unique and desirable combination of properties creating varied areas of utility for the article in both commercial and governmental operations.

While a rather elaborate form of the invention has been set forth in the preferred embodiment illustrated, the article may assume simpler or more complex forms without departing from the spirit of the invention. For example, the substrate may comprise a conventional paper, textile, or other backing having information recorded thereon and overlaid with a protective coating transparent to the information and to which an erasible, opaque surfacing is applied.

Further, the recorded information may be such as to be rendered readable after removal of the opaque surfacing only by the action of light, chemicals, electrical or other means, or the information may be such as to remain invisible rendered readable only by audible reproduction and subsequent copying.

The opaque surface coating may be any substance capable of being coated or plated on the substrate in sufficiently thin form to be capable of ready removal therefrom, e.g., a lacquered cellulose acetate film. Single or plural coatings may be used.

While a particular adhesive system has been illustrated and described it will be understood that this system is merely illustrative and that the form the article will take is to a great degree dependent on the use to which it is to be put. The adhesive system specifically illustrated is one providing maximum security; where only minimum security is required, simpler constructions serve equally well. For example, a relatively uncomplicated construction is one wherein there is applied to the non-adhesive side of a pressure-sensitive tape a thin, opaque metallic coating capable of ready removal by erasure or other light abrasion, sparking, or solvents, etc., the tape so prepared then being adhered to a printed backing in overlying relation to the printing on the backing.

Articles are possible wherein the substrate has incorporated therewith or therewithin, globules or capsules containing reactive substances which when released by the exertion of pressure, react with other substances in the production of visible characters or symbols. The pressure of erasure on the opaque coating surfacing the substrate may be utilized as the pressure for releasing the reactive substances. Another construction is one wherein the recorded information in the substrate is formed of substances dissolvable in the same solvents as the adhesive base on which it is recorded. Many other forms are also possible and it is desired to limit the invention only as required by the appended claims.

What is claimed as new is as follows:

1. As a means for concealing recorded information, and enabling ready revelation thereof, an article comprising a substrate carrying recorded information readable from at least one surface thereof and resistant to removal therefrom by mild abrasive action, and opaque metallic covering layer adhered to said one surface of said substrate and overlying and concealing said recorded information, said opaque covering layer containing contaminants forming a random patterned exposed surface and being removable from said substrate by mild abrasive action.

2. In combination, an opaque substrate carrying indicia thereon visible from one surface thereof, an abrasion resistant transparent layer overlying said indicia and being adhered to said substrate, a thin opaque metallic coating overlying said transparent layer and concealing said indicia, said metallic coating being erasably adhered to said transparent layer for ready removal therefrom by the pressure of a rubber eraser to expose said indicia to view.

3. In combination, an opaque substrate carrying indicia thereon visible from one surface thereof, an abrasion resistant transparent layer overlying said indicia and being adhered to said substrate, a thin opaque metallic coating containing contaminants therein forming a randomly patterned surface overying said transparent layer and concealing said indicia, said metallic coating being erasably adhered to said transparent layer for ready removal therefrom by the pressure of a rubber eraser to expose said indicia to view.

4. In combination, a thin abrasion resistant sheet of transparent material having visible indicia embedded therewithin, an opaque covering on each surface of said sheet concealing said indicia from view, at least one of said coverings comprising a thin opaque randomly patterned metallic coating containing at least one metal oxide therein, forming a randomly patterned surface, said metallic coating being erasably adhered to said transparent sheet for ready removal therefrom.

5. In combination, an opaque substrate carrying indicia thereon visible from one surface thereof, an abrasion resistant transparent layer overlying said indicia and being adhered to said substrate, a thin opaque metallic coating containing at least one metal oxide therein forming a randomly patterned surface overlying said transparent layer and concealing said indicia, said metallic coating being erasably adhered to said transparent layer for ready removal therefrom by the pressure of a rubber eraser to expose said indicia to view.

References Cited in the file of this patent

UNITED STATES PATENTS

| | | |
|---|---|---|
| 1,431,903 | Becker | Oct. 10, 1922 |
| 1,588,201 | Smith | June 8, 1926 |
| 1,825,796 | Hummell | Oct. 7, 1931 |
| 2,005,105 | Neff | June 18, 1935 |
| 2,200,893 | Pollack | May 14, 1940 |
| 3,250,197 | Humphner | July 22, 1941 |
| 2,520,077 | Wolowitz | Aug. 22, 1950 |